United States Patent [19]

Kokubu

[11] Patent Number: 5,801,614
[45] Date of Patent: Sep. 1, 1998

[54] VEHICLE STARTING CONTROL DEVICE

[75] Inventor: Sadao Kokubu, Niwa-gun, Japan

[73] Assignee: Kabushiki Kaisha Tokai-Rika-Denki-Seisakusho, Aichi-Ken, Japan

[21] Appl. No.: 849,088

[22] PCT Filed: Nov. 28, 1995

[86] PCT No.: PCT/JP95/02417

§ 371 Date: May 28, 1997

§ 102(e) Date: May 28, 1997

[87] PCT Pub. No.: WO96/16844

PCT Pub. Date: Jun. 6, 1996

[30] Foreign Application Priority Data

Nov. 30, 1994  [JP]  Japan ................. 6-296329

[51] Int. Cl.$^6$ ............................................. B60R 1/00
[52] U.S. Cl. .............. 340/425.5; 340/426; 340/825.31; 307/10.2; 307/10.4
[58] Field of Search .................. 340/425.5, 426, 340/825.31, 825.32, 825.34, 825.61, 825.72; 307/10.2, 10.4, 10.5; 180/287; 70/252, 278

[56] References Cited

U.S. PATENT DOCUMENTS

| | | | |
|---|---|---|---|
| 3,755,777 | 8/1973 | Lee | 307/10.4 |
| 4,761,645 | 8/1988 | Mochida | 340/825.31 |
| 4,763,121 | 8/1988 | Tomoda et al. | 340/825.54 |
| 4,777,377 | 10/1988 | Jeter | 307/10.2 |
| 4,827,744 | 5/1989 | Namazue et al. | 70/252 |
| 4,873,530 | 10/1989 | Takeuchi et al. | 343/711 |
| 4,973,958 | 11/1990 | Hirano et al. | 340/825.69 |
| 5,157,389 | 10/1992 | Kurozu et al. | 340/825.31 |
| 5,433,096 | 7/1995 | Janssen et al. | 70/278 |
| 5,434,395 | 7/1995 | Storck et al. | 235/380 |
| 5,656,867 | 8/1997 | Kokubu | 307/10.5 |

FOREIGN PATENT DOCUMENTS

| | | |
|---|---|---|
| U-60-18026 | 2/1985 | Japan . |
| A-64-52549 | 2/1989 | Japan . |
| A-64-70249 | 3/1989 | Japan . |
| U-1-128449 | 9/1989 | Japan . |
| A-3-61146 | 3/1991 | Japan . |
| A-3-74237 | 3/1991 | Japan . |
| A-3-148352 | 6/1991 | Japan . |
| A-3-148353 | 6/1991 | Japan . |
| A-4-38246 | 2/1992 | Japan . |
| B2-4-15140 | 3/1992 | Japan . |
| A-5-65052 | 3/1993 | Japan . |

*Primary Examiner*—Brent A. Swarthout
*Assistant Examiner*—Van T. Trieu
*Attorney, Agent, or Firm*—Oliff & Berridge, PLC

[57] ABSTRACT

A vehicle starting control device which implements inhibiting/enabling of the rotation of a steering shaft when a storing medium is used as an ignition key. A system ECU 19 reads an ID code stored in an IC card 2 via a communication means 24, outputs a permission code to a knob rotation inhibiting means 27 at the time when the system ECU 19 determines that the IC card 2 is an ordinary one, and, when an ignition knob 23 has been set to the LOCK position in an outputting state of the permission code, terminates outputting of the permission code. The knob rotation inhibiting means 27 basically inhibits the rotation of the ignition knob 23, and enables the rotation of the ignition knob 23 in a state in which the permission code is being input. A steering lock means 28 cancels a rotation-inhibiting state of the steering shaft due to a steering lock means 29 in a state that the ignition knob 23 has been set to positions other than the LOCK position.

11 Claims, 18 Drawing Sheets

F I G. 2
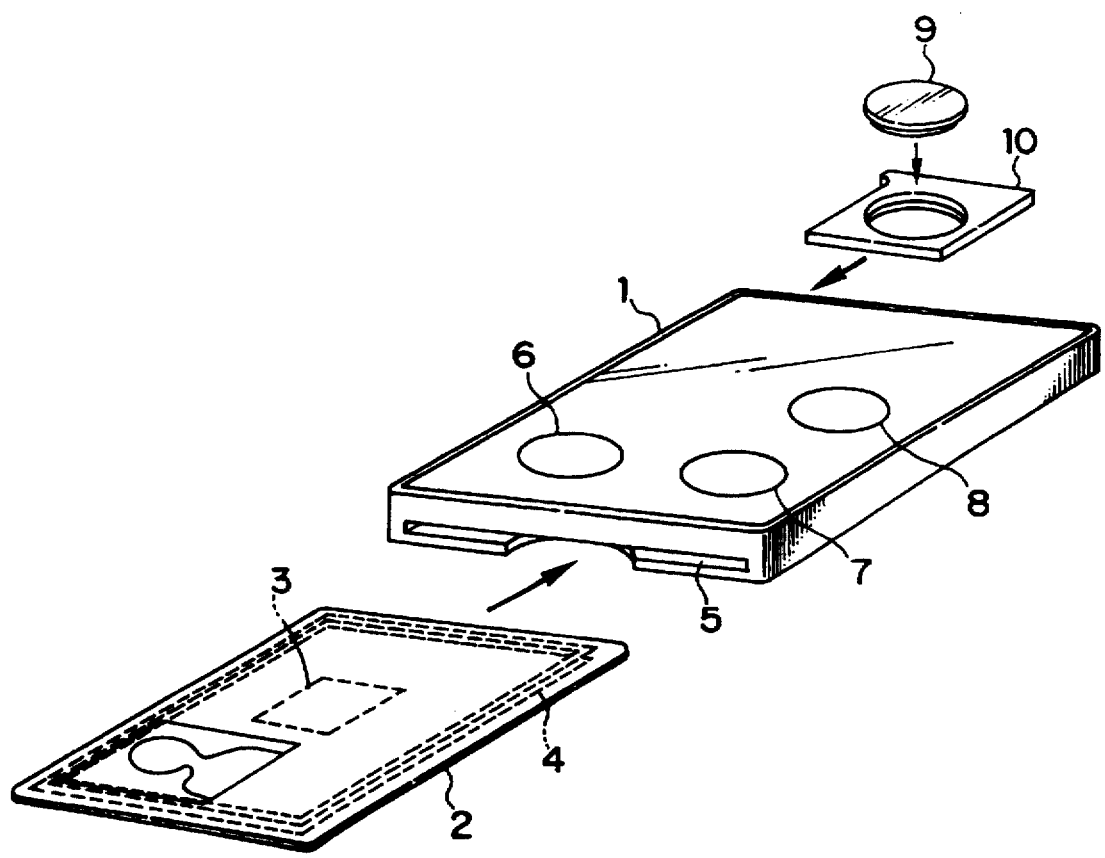

F I G. 3
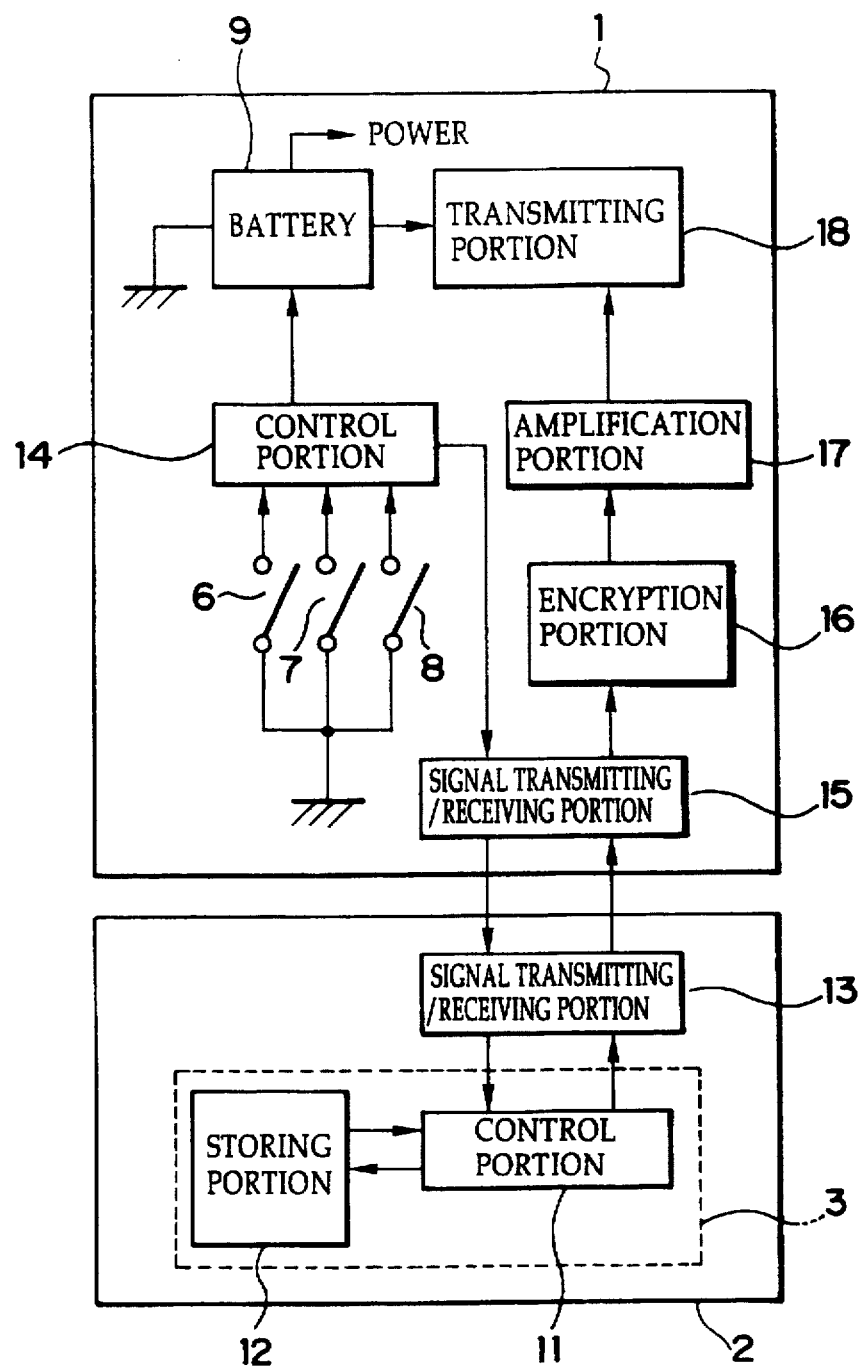

VEHICLE STARTING CONTROL DEVICE

FIELD OF THE INVENTION

The present invention relates to a device for controlling the starting of a vehicle by making use of a storing medium such as an IC memory card (which involves a concept of including an IC card memory without a CPU installed therein) or the like in which an ID code is stored.

DESCRIPTION OF THE RELATED ART

In recent years, an idea has been thought of in which an IC card, in which an identification code is stored, is used as a driver's license. Namely, personal data about the owner of the IC card and/or a history of traffic violations by the owner is stored beforehand in the IC card so that issue and/or renewal of the driver's license and traffic violations can be managed readily by reading data from the IC card as needed.

Another idea has focused on using the above-described IC card as an ignition key, and the card is structured such that an ID code is stored beforehand in the IC card, and when the IC card is inserted into an IC card reader installed in a vehicle, the ID code which has been stored in the IC card is read by an IC card reader. Further, when the read ID code corresponds to a register code which has been preset, in response to an ON state of a switch, the starting of the engine of the vehicle is permitted.

In this case, because the ID code which has been stored in the IC card has excellent confidentiality, more reliable safety can be obtained as compared to an ordinary ignition key.

However, when an ordinary ignition key has been set to a LOCK position which is a run-inhibiting position for a vehicle, the ordinary ignition key mechanically inhibits the rotation of a steering shaft. Meanwhile, when the ordinary ignition key has been set to a run-enabling position for a vehicle (for example, ACC position or ON position) other than LOCK position, the ordinary ignition key cancels the state inhibiting the rotation of the steering shaft. Therefore, a drawback arises in that it is impossible to use the IC card instead of an ignition key which also functions as steering lock means by merely structuring the vehicle starting control device in such a manner that the starting of the engine is enabled in response to a switching operation at the time when the stored ID code in the IC card corresponds to the registered code.

Further, in the related art, as disclosed in Japanese Patent Application Laid-Open (JP-A) No. 5-65052, a relationship between the orientation of a steering lock means which inhibits the rotation of a steering shaft, and operation means (a frame) which transmits a "lock" or an "unlock" mechanism to steering lock means due to a rotational force thereof has been permitted within a certain tilt angle, but not within angles in all directions (for example, at the angles of 90° and 360°). Therefore, there is a problem in that the orientation of the operation means is restricted to the position of the steering lock means or the steering shaft.

DISCLOSURE OF THE INVENTION

In view of the aforementioned, it is an object of the present invention to provide a vehicle starting control device which can inhibit/enable the rotation of the steering shaft in a case in which a storing medium such as an IC card or the like is used as an ignition key.

The present invention comprises a storing medium which stores a specific identification code; media accommodating means which is provided at a vehicle and can accommodate the storing medium thereinto; communication means which can communicate with the storing medium in a state in which the storing medium has been accommodated in the media accommodating means; operation means which is operable between a run-inhibiting position inhibiting the running of the vehicle and a run-enabling position including an engine starting position; steering lock means which inhibits the rotation of a steering shaft in a state in which the operation means has been set to the run-inhibiting position; steering lock cancellation means which cancels an inhibiting state of the rotation of the steering shaft due to the steering lock means in a state in which the operation means has been set to the run-enabling position; operation-inhibiting means which inhibits the operation means from effecting a position changing operation between the run-inhibiting position and the run-enabling position; and identification-enabling means which, when a predetermined operation has been effected, reads an identification code stored in the storing medium via the communication means, identifies whether or not the identification code read and a register code which has been registered previously correspond to each other, and, when the identification code read and the register code correspond to each other, permits to effect a position changing operation between the run-inhibiting position and the run-enabling position.

In accordance with the present invention, the operation-inhibiting means inhibits the operation means from effecting the position changing operation between the run-inhibiting position and the run-enabling position. Accordingly, it is impossible to start the engine by setting the operation means from the run-inhibiting position to the run-enabling position. In order to start the engine, it is necessary to effect a predetermined operation in a state in which the stored medium has been accommodated in the media accommodating means.

The identification-enabling means reads the identification code which has been stored in the storing medium via the communication means, and identifies whether or not the identification code read corresponds to a register code which has been registered previously. When they correspond to each other, the identification-enabling means enables the position changing operation between the run-inhibiting position and the run-enabling position.

Since the operation-inhibiting means is able to cancel the inhibiting state of operation due to the operation means, the engine can also be started by operating the operation means.

On the other hand, the steering lock means inhibits the rotation of the steering shaft in a state in which the operation means has been set to the run-inhibiting position. As described above, when the operation means has been set from the run-inhibiting position to the run-enabling position, the steering lock cancellation means cancels the state inhibiting the rotation of the steering shaft due to the steering lock means so that a steering operation can be effected.

In this way, the present invention is structured such that the steering lock means inhibits the rotation of the steering shaft in a state in which the operation means has been set to the run-inhibiting position, and the steering lock cancellation means permits the rotation of the steering shaft in a state in which the operation means has been set to the run-enabling position, and, the operation means is made to be freely operable between the run-inhibiting position and the run-enabling position at the time when the identification code stored in the storing medium corresponds to the preset register code. As a result, when the storing medium is used as an ignition key, enabling/inhibiting of steering shaft operation can be implemented.

In this case, since the identification-enabling means cancels the permission of the position changing operation at the time when the operation means has been set to the operation-inhibiting position in an enabling state of the position changing operation, the steering shaft is inhibited from being rotated. As a result, it is possible to obtain a higher vehicle safety.

Further, since the present invention further comprises operation position detecting means for detecting which of the run-inhibiting position and the run-enabling position the operation means has been set to, it is possible to control the engine on the basis of the detected results.

In accordance with the present invention, since the operation means includes a verification position which judges true or false for the storing medium between the run-inhibiting position and the run-enabling position, it is possible to judge whether the storing medium is true or false on the basis of the operation of the operation means.

The present invention further comprises media detecting means which detects that the storing medium has been accommodated in the media accommodating means, wherein the identification-enabling means reads the identification code at the time when the media detecting means has detected that the storing medium has been accommodated in the media accommodating means, and identifies whether or not the identification code read corresponds to the register code. Accordingly, by merely accommodating the storing medium into the media detecting means, it is possible to judge true or false for the storing medium.

Since the present invention further comprises media removal-inhibiting means which inhibits the storing means from being removed from the media accommodating means in a state in which the operation means has been set to the run-enabling position, system failure caused by the removal of the storing medium from the storing media accommodating means can be prevented.

The present invention is structured such that the communication means communicates with the storing medium via an electromagnetic coupler. Accordingly, a typical storing means with an antenna coil can be used.

Further, since the present invention is structured such that the identification-enabling means encrypts an operation-enabling signal indicating the enabling of the position changing operation, and outputs the same, the operation due to the operation means is prevented from being permitted unexpectedly.

Moreover, the present invention is structured such that the identification-enabling means inhibits the permission of the position changing operation from being canceled while a vehicle is in a running state. Accordingly, at the time of the running of a vehicle, since the operation means is inhibited from being set from the run-enabling position to the run-inhibiting position, it is possible to prevent the operation means from being unexpectedly set to the run-inhibiting position.

Further, the present invention is structured such that the operating position detecting means encrypts an operating position signal indicating an operating position by the operation means, and outputs the same. Accordingly, the operation (for setting an operating position) due to the operation means can be kept confidential.

Since the present invention is structured such that the identification-enabling means, the operation-inhibiting means, and the operating position detecting means are installed in a closed housing body, more reliable safety can be obtained as compared to a possible case in which these means are exposed outside.

The present invention is structured such that the operation means and/or the operation-inhibiting means and the steering lock means and/or steering lock cancellation means are connected to each other by flexible connecting means with flexibility so as to be connectable to each other regardless their orientation. Accordingly, the degree of freedom in orientation of vehicle components increases so that errors in operation can be offset.

Moreover, in the present invention, when the operation means has been operated, the operation due to the operation means as a rotational force is transmitted to the steering lock means and/or the steering lock cancellation means by flexible connecting means, the operation due to the operation means as the rotational force is transmitted to the steering lock means and/or the steering lock cancellation means. As a result, the operation means can be disposed arbitrarily.

BRIEF DESCRIPTION OF THE DRAWINGS

FIG. 2 is a perspective view of an IC card holder into which an IC card is inserted.

FIG. 3 is a view illustrating the respective electrical structures of the IC card and the IC card holder.

BEST MODE OF THE INVENTION

Figure 1:
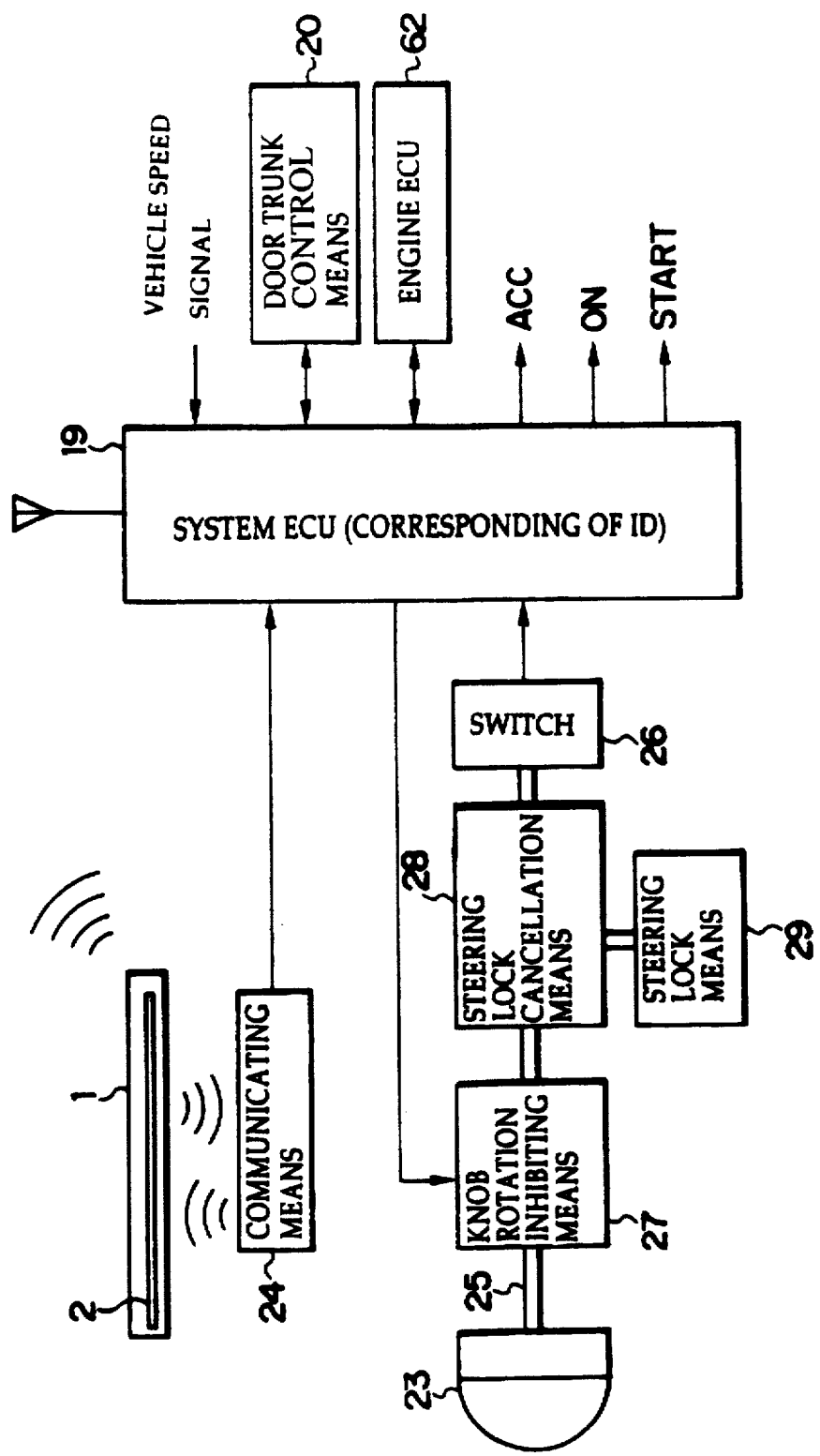
FIG. 1 is a schematic overall view of a first embodiment of the present invention.
Figure 4:
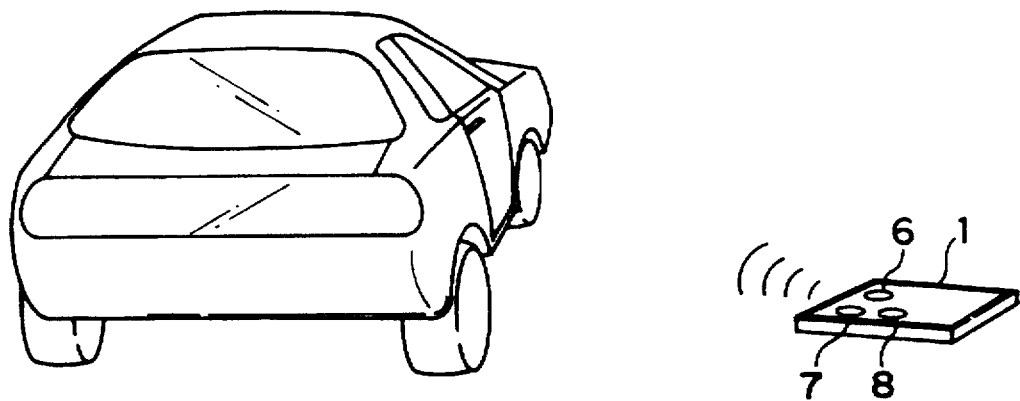
FIG. 4 is a view of a keyless entry system using the IC card holder.

A description of a first embodiment in which the present invention is applied to an engine starting system for a vehicle will be given with reference to FIGS. 1 through 14. Further, in the present embodiment, it is structured such that the engine starting system includes a keyless entry system.

First of all, a description of a keyless entry system using an IC card will be given. FIG. 2 shows the appearance of an IC card holder 1 as a media accommodating means, and an IC card 2 as a storing medium which is inserted into the IC card holder 1. In FIG. 2, the IC card 2 is also structured to serve as a driver's license. An IC chip 3 including a CPU and EEPROM is embedded in the IC card 2. A portrait of the owner of the IC card and characters or the like necessary to be included in the IC card (not shown) are provided on the surface of the IC card 2 through printing and an embossing processing. More specifically, an antenna coil 4 is embedded in the IC card 2 so as to generate an electromagnetic action, and power is supplied to the IC chip 3 due to the electromagnetic action.

The aforementioned IC card 2 can be inserted into the IC card holder 1. Namely, the IC card holder 1 holds the IC card 2 in a state in which the IC card 2 is accommodated in the IC card holder 1. The IC card holder 1 has a slit 5 at the end surface thereof, into which the IC card 2 is inserted, and is formed in a thin rectangular container shape. A lock switch 6, an unlock switch 7 and a trunk opener switch 8 are provided on the upper surface of the IC card holder 1. A button-shaped battery 9 is also inserted into the IC card holder 1 via a cartridge 10.

In FIG. 3, respective electrical structures of the IC card holder 1 and the IC card 2 are shown in a function block. In this figure, the IC card 2 is constituted by a control portion 11 mainly consisted of a CPU, a storing portion 12 consisted by EEPROM, and a signal transmitting/receiving portion 13. The signal transmitting/receiving portion 13 is consisted of an antenna coil 4. Further, a specific ID code for the owner of the IC card 2 is stored in the storing portion 12 in a state in which the ID code is not rewritable. In the storing portion 12, optional data can be written to an area other than the area storing the ID code.

In addition to the lock switch 6, the unlock switch 7, the trunk opener switch 8, and the battery 9, a control portion 14, a signal transmitting/receiving portion 15, an encrypting portion 16, an amplification portion 17, and a transmitting portion 18 are provided in the IC card holder 1. The signal transmitting/receiving portion 15 is consisted of a coil opposing the antenna coil 4 in the IC card 2.

The control portion 14 of the IC card holder 1 is mainly made of a microcomputer. When any one of the lock switch 6, the unlock switch 7, and the trunk opener switch 8 is energized, the control portion 14 outputs a query signal to the signal transmitting/receiving portion 15. The query signal is transmitted to the control portion 11 via the signal transmitting/receiving portion 13. When the lock switch 6 is operated, the control portion 14 of the IC card holder 1 controls to transmit a lock operation signal to the amplification portion 17. The amplification portion 17 amplifies the signal which is formed by combining the above lock operation signal with an encryption signal having an ID code, and outputs to the transmitting portion 18 the amplified signal as described above. Accordingly, when the lock switch 6 is energized, a lock signal including the encrypted ID code is transmitted from the IC card holder 1 by waves.

Further, when the unlock switch 7 or the trunk opener switch 8 is energized, the control portion 14 of the IC card holder 1 outputs signals to the amplification portion 17 an unlock operation signal or a trunk opener operation signal. An unlock signal having the encrypted ID code, or an trunk opener signal is output from the IC card holder 1 by waves.

A system ECU 19 is mounted in a vehicle and serves as an identification-enabling means which receives a signal transmitted from the aforementioned IC card holder 1 (see FIG. 1). The system ECU 19 decodes an ID code which has been written to the received signal from the IC card holder 1. When the ID code corresponds to a preset register code, in accordance with the operational contents shown by the received signal, the system ECU 19 is to send instructions to a door trunk control means 20.

When it is determined by the system ECU 19 that the system ECU 19 has received a lock signal, the system ECU 19 instructs the door trunk control means 20 to execute a lock operation. When it is determined by the system ECU 19 that the system ECU 19 has received an unlock signal, the system ECU 19 instructs the door trunk control means 20 to execute an unlock operation. Further, when it is determined by the system ECU 19 that the system ECU 19 has received a trunk opener signal, the system ECU 19 instructs the door trunk control means 20 to implement a trunk opening operation. When the door trunk control means 20 has received a lock instruction or an unlock instruction from the system ECU 19, the door trunk control means 20 operates to lock or unlock a door lock mechanism (not shown), while, when the door trunk control means 20 has received a trunk opening instruction, the door trunk control means 20 operates to unlock a trunk lid mechanism (not shown).

In the case of a keyless entry system having the above described structure, unless a transmitting function for transmitting, by waves, the ID code stored in the storing portion 12 of the IC card 2 per se which also plays the role of a driver's license is not available in the keyless entry system, merely by inserting the IC card 2 into the IC card holder 1, the ID code can be transmitted to the above system ECU 19. As a result, it is possible to build up the keyless entry system using the IC card 2 so that a user of the IC card 2 can lock or unlock the door lock mechanism from a position away from the vehicle (see FIG. 4).

Next, a description of an engine starting system using the above-described IC card 2 according to the present invention will be given hereinafter.

Figure 5:
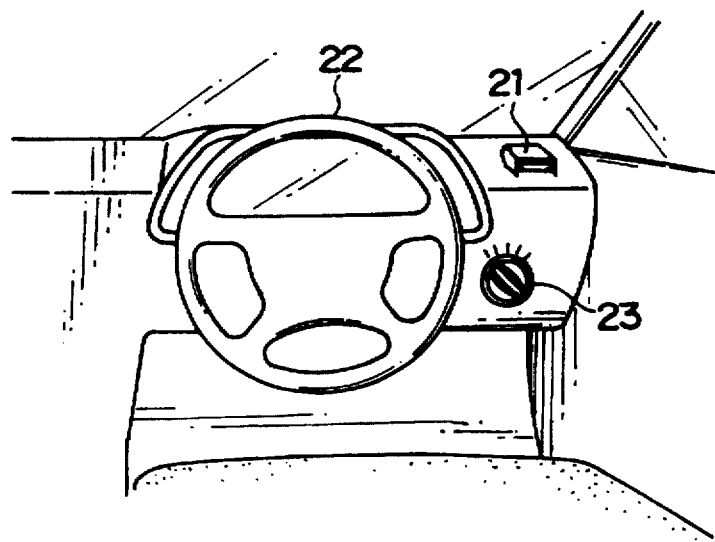
FIG. 5 is a view illustrating an instrument panel.

FIG. 5 shows a front of a driver's seat of the vehicle. In this figure, a card setting portion 21 which is formed in a throttle shape is provided at a dashboard which is continuous with an instrument panel at the side of the driver's seat. When the vehicle is driven, the IC card holder 1 into which the IC card 2 has been inserted is set into the card setting portion 21. Further, an ignition knob 23 serving as an operation means is provided at a portion of the instrument panel at the side of the steering wheel 22. In this case, the ignition knob 23 is structured such that the rotational operation thereof is enabled only in a state in which the IC card holder 1 including an ordinary IC card 2 has been set into the card setting portion 21.

Figure 6:
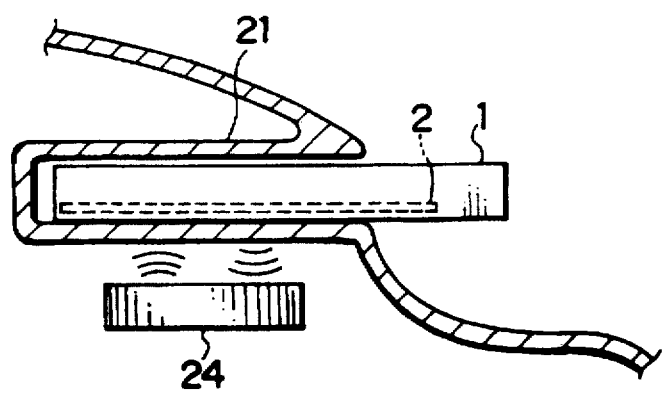
FIG. 6 is a longitudinal cross-sectional view of a card setting portion.

FIG. 6 shows a cross section of the card setting portion 21. As shown in FIG. 6, communication means 24 having a coil therein is disposed at a lower position of the card setting portion 21. The IC card 2 which has been inserted into the IC card holder 1 is disposed so as to oppose the coil of the communication means 24 in a state in which the IC card holder 1 has been set into the card setting portion 21.

Figure 7:
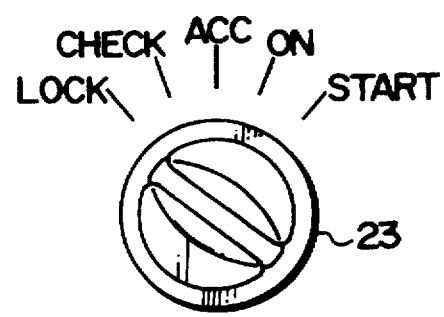
FIG. 7 is a front view of an ignition knob.

As shown in FIG. 7, a LOCK position, CHECK position, ACC position, ON position, and START position are provided at the ignition knob 23. The LOCK position and CHECK position are set to a run-inhibiting position, respectively. The ACC position, ON position and START position are set to a run-enabling position, respectively. It should be noted that, when the ignition knob 23 has been set to the LOCK position, only the rotational operation thereof to the CHECK position is permitted.

FIG. 1 shows a schematic overall structure of the engine starting system and the keyless entry system which have been described above. In this figure, the aforementioned ignition knob 23 is connected to a switch 26 serving as an operating position detecting portion via a shaft 25. A knob rotation-inhibiting means 27 and a steering lock cancellation means 28 serving as an operation-inhibiting means are provided at the shaft 25.

Ordinarily, the knob rotation inhibiting means 27 inhibits the rotation of the shaft 25 or the ignition knob 23, while in a state in which a permission code serving as the operation-enabling signal has been input from the system ECU 19, the knob rotation inhibiting means 27 cancels the inhibiting state of the rotation of the shaft 25. More specifically, when the ignition knob 23 has been set to the LOCK position, further rotational operation to any one of the ACC, ON, and START positions due to the ignition knob 23 is inhibited, while in a state in which a permission code has been output from the system ECU 19, the further rotational operation to any one of the ACC, ON, and START positions due to the ignition knob 23 is enabled.

Further, in a state in which the ignition knob 23 has been set to any one of the ACC, ON, and START positions, the steering lock cancellation means 28 cancels the inhibiting state of the rotation of the steering wheel 22 due to a steering lock means 29.

Figure 8:
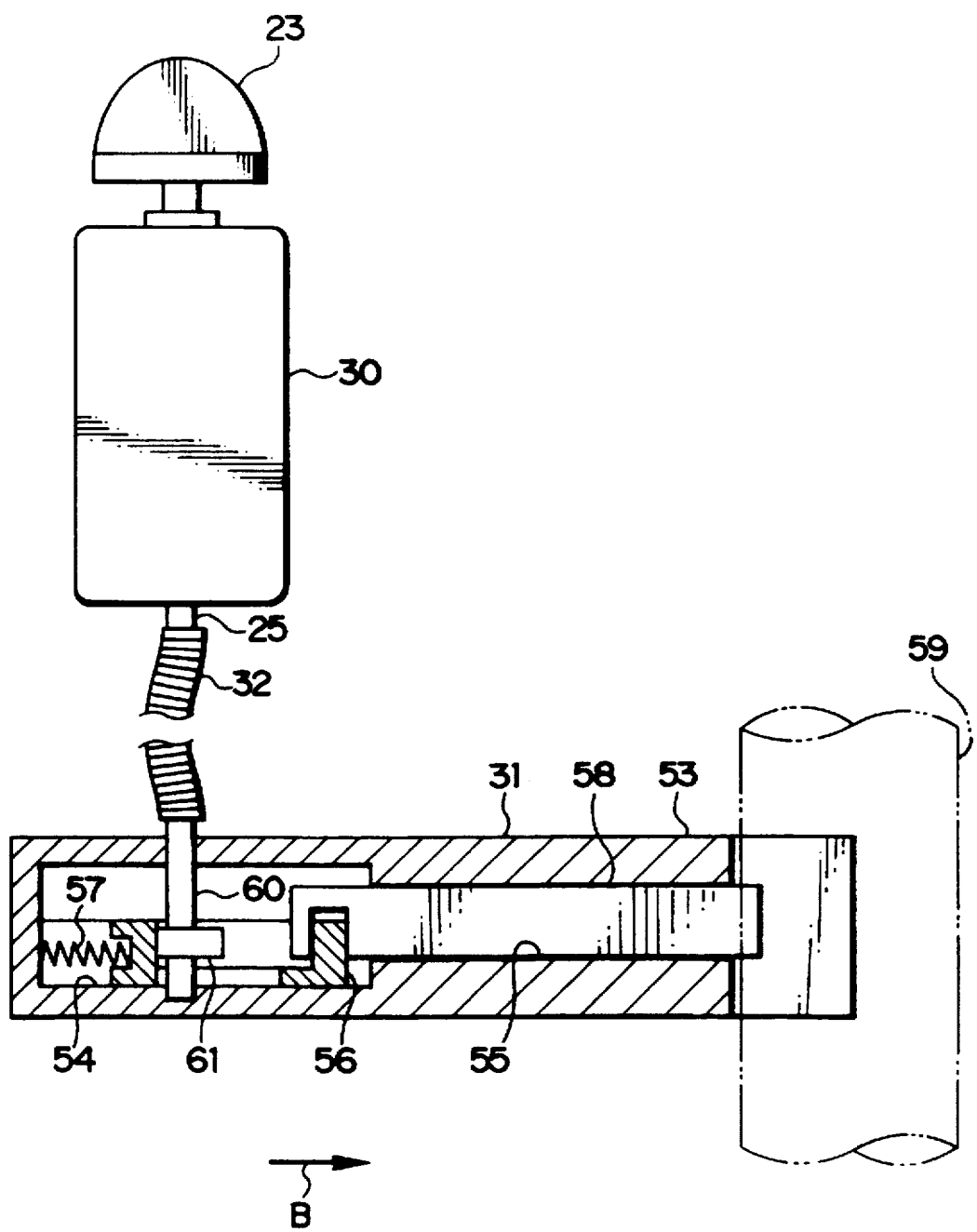
FIG. 8 is a view of a connective structure of an ignition switch portion and a steering lock portion.

FIG. 8 shows an ignition switch portion 30 having a switch 26 and a knob rotation inhibiting means 27, and a steering lock portion 31 having a steering lock cancellation means 28 and a steering lock means 29. In this figure, a flexible shaft 32 serving as a flexible connecting means is fixed to the shaft 25 of the ignition switch portion 30. Via the flexible shaft 32, the rotational force due to the ignition knob 23 which is mounted to the ignition switch portion 30 is transmitted to the steering lock portion 31. The flexible shaft 32 is a connecting member having a flexibility which enables the rotational force from the shaft 25 to be transmitted to a shaft 60 in spite of its orientation.

A description of the structure of the ignition switch portion 30 will be given hereinafter on the basis of FIGS. 9 through 11.

Figure 9:
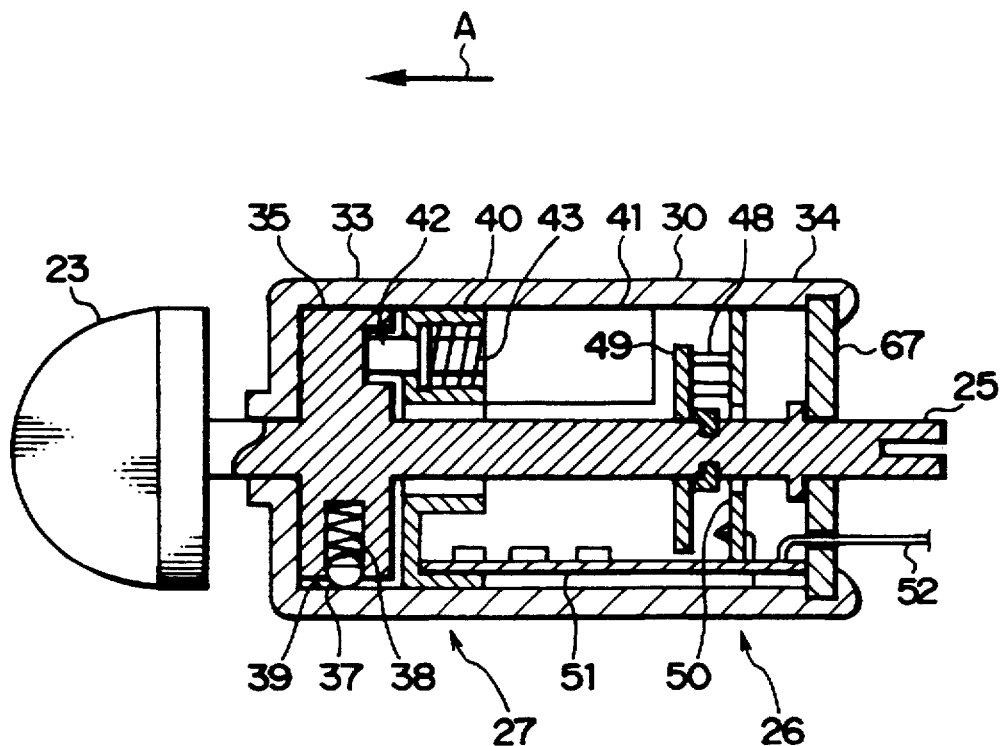
FIG. 9 is a longitudinal cross-sectional view of the ignition switch portion.
Figure 10:
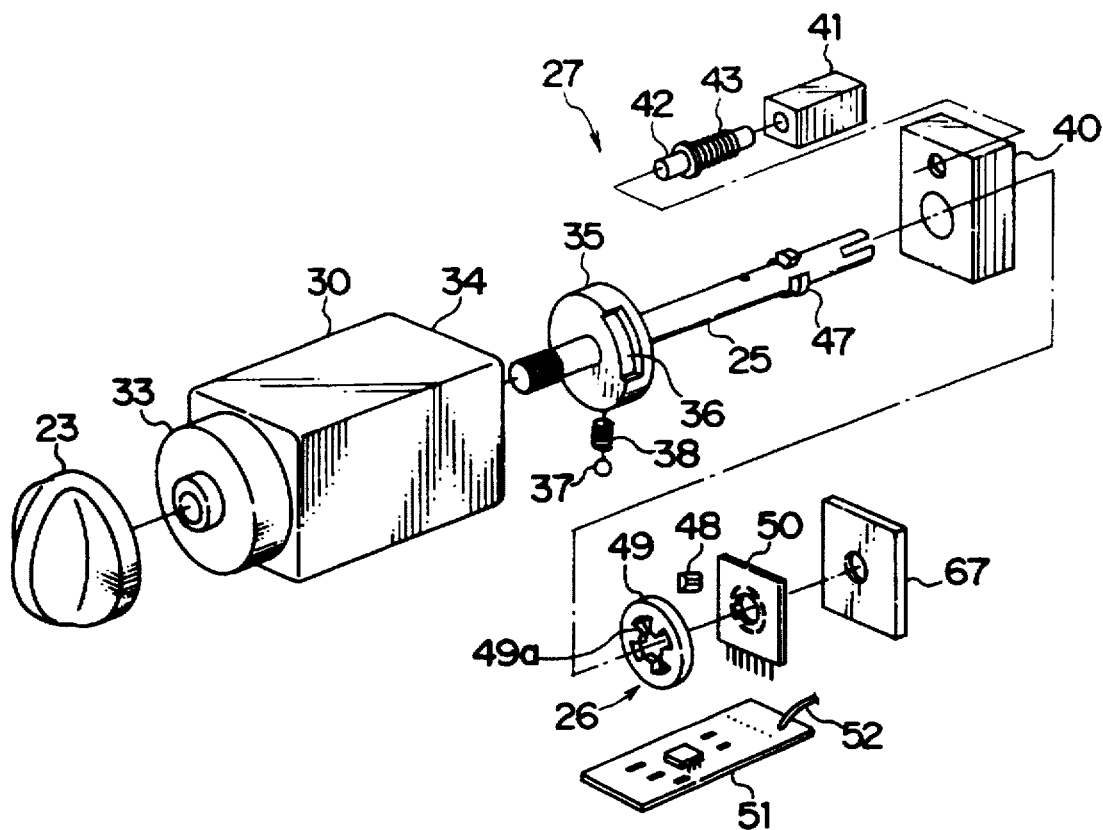
FIG. 10 is an exploded perspective view of the ignition switch portion.
Figure 11:
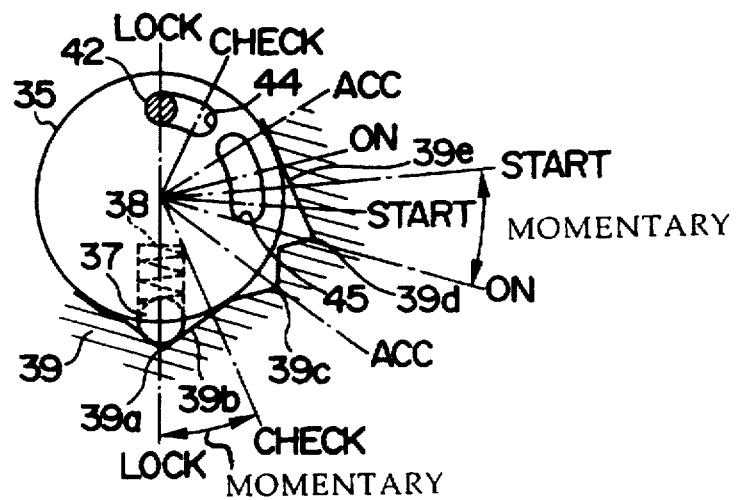
FIG. 11 is a view of a detent relationship of a lock plate and a body.

In FIGS. 9 and 10, the ignition switch portion 30 is assembled in a body 34 as a housing which has a substantially rectangular cylindrical shape whose end portion is open, and has a cylinder-shaped portion 33 at the tip thereof. The open end portion of the body 34 is closed by a cap 67. The shaft 25 passes through the tip of the body 34 and the cap 67 so as to be rotatably supported. The ignition knob 23 is installed at the tip of the shaft 25 projecting from the front of the ignition switch portion 30.

In the body 34, a disc-shaped lock plate 35 is provided to be integral with the shaft 25, and is disposed within the cylinder-shaped portion 33 of the ignition switch portion 30. An engaging groove portion 36 (only shown in FIG. 10) is formed at the outer peripheral surface portion of the lock plate 35 so as to make a predetermined angle with respect to a radius of the shaft 25 which has a common center with the lock plate 35. An engaging pawl portion (not shown), which is provided at the inner surface portion of the cylinder-shaped portion 33, engages with the engaging groove portion 36, and allows the ignition knob 23 to only rotate from the LOCK position to the START position. In this case, an urging force is applied to the ignition knob 23 by an unillustrated urging means so that the ignition knob 23 is allowed to return to the ON position constantly between the ON position and the START position. A detent ball 37 is provided at the outer peripheral surface portion of the lock plate 35 so as to project therefrom due to an urging force generated by a compression coil spring 38. The detent ball 37 engages with a zigzag-shaped detent portion 39 formed at the inner surface portion of the cylinder-shaped portion 33 so that detent is applied to the ignition knob 23 at each of the operational positions of the CHECK position, ACC position, and ON position.

On the other hand, a stopper 40 is fitted into the body 34, which allows the lock stopper 35 to be positioned. An electromagnetic solenoid 41 is fixed to the stopper 40. In the electromagnetic solenoid 41, due to the urging force from a compression coil spring 43, a lock pin 42 serving as a plunger projects in a direction of the arrow indicated by A which is shown in FIG. 9.

The lock pin 42 engages with the lock plate 35, through which engagement the rotation of the lock plate 35 can be controlled. More specifically, as shown in FIG. 11, a first groove portion 44 and a second groove portion 45 are provided at the back surface portion of the lock plate 35 concentric to the lock plate 35 so as to form a predetermined angle therebetween. The lock pin 42 is inserted into the first groove portion 44 or the second groove portion 45. Depending on a state in which the lock pin 42 is inserted into the first groove portion 44 or the second groove portion 45, the rotation of the lock plate 35 or the ignition knob 23 is thereby controlled. More specifically, the first groove portion 44 corresponds to the angle between the LOCK position and the CHECK position. Accordingly, as shown in FIG. 11, in a state in which the lock pin 42 is inserted into the first groove portion 44, the rotation of the ignition knob 23 is enabled between the LOCK position and the CHECK position. Meanwhile, the second groove portion 45 corresponds to the angle between the ACC position and the START position. In a state in which the lock pin 42 is inserted into the second groove portion 45, the rotation of the ignition knob 23 is enabled between ACC position and START position. As a result, the knob rotation inhibiting means 27 is constituted by the aforementioned lock plate 35 and lock pin 42.

A description of the relationship between the detent ball 37 which is provided so as to project from the lock plate 35 and the detent portion 39 which is provided at the inner surface portion of the cylinder-shaped portion 33 of the body 34 will be given hereinafter with reference to FIG. 11. In this figure, a LOCK position detent valley 39a, a CHECK position detent slope 39b, an ACC position detent valley 39c, an ON position detent valley 39d, and a START position detent slope 39e are formed at the detent portion 39. When the detent ball 37 is positioned at one of the LOCK position detent valley 39a, ACC position detent valley 39c, and ON position, detent valley 39d, the detent ball 37 is fitted into one of the aforementioned detent valleys 39a, 39c, and 39d, and detent is applied to the ignition knob 23 at each of the detent positions.

Meanwhile, when the detent ball 37 is positioned at the CHECK position detent slope 30b or the START position detent slope 39e, because the detent ball 37 tends to descend, a rotational force by which the ignition knob 23 is rotated to return from the CHECK position to the LOCK position, or a rotational force by which the ignition knob 23 is rotated to return to the ON position from the START position is applied to the ignition knob 23. That is to say, the ignition knob 23 is formed into a momentary configuration so as to return from the CHECK position to the LOCK position, or the ignition knob 23 is formed into a momentary configuration so as to return to the ON position from the START position.

In FIGS. 9 and 10, an engaging projection 47 is formed at the shaft 25 and a contact holder 49 having a contact 48 is fixed thereto. A through-hole 49a having a plurality of slits is formed at the contact holder 49, and the engaging projection 47 engages with the through-hole 49a so that the contact holder 49 and the shaft 25 are integrated with each other.

On the other hand, an insulator 50 is secured to the body 34 so as to face the contact holder 49. A fixing contact is provided on the surface of the insulator 50. A switch 26 comprises the fixing contact and the contact 48. In a state in which the ignition knob 23 has been set to each operational position, the switch 26 corresponding to the selected operational position is turned on.

A printed wiring board 51 is disposed in the body 34 and a control circuit is installed on the printed wiring board 51. When a permission code has been input from the system ECU 19 via the lead 52, the control circuit operates the electromagnetic solenoid 41. Meanwhile, when the permission code is no longer input from the ECU, the control circuit terminates the operation for the electromagnetic solenoid 41. Further, the control circuit inputs an ON signal from the switch 26, and outputs a code signal indicating the position of the ignition knob 23 via the lead 52 on the basis of the input ON signal. More specifically, when the switch 26 corresponding to LOCK position is turned on, the control circuit outputs "001" as a code signal. When the switch 26 corresponding to the CHECK position is turned on, the control circuit outputs "010" as a code signal. When the switch 26 corresponding to the ACC position is turned on, the control circuit outputs "011" as a code signal. When the switch 26 corresponding to the ON position is turned on, the control circuit outputs "100" as a code signal. When the switch 26 corresponding to the START position is turned on, the control circuit outputs "101" as a code signal.

Figure 12:
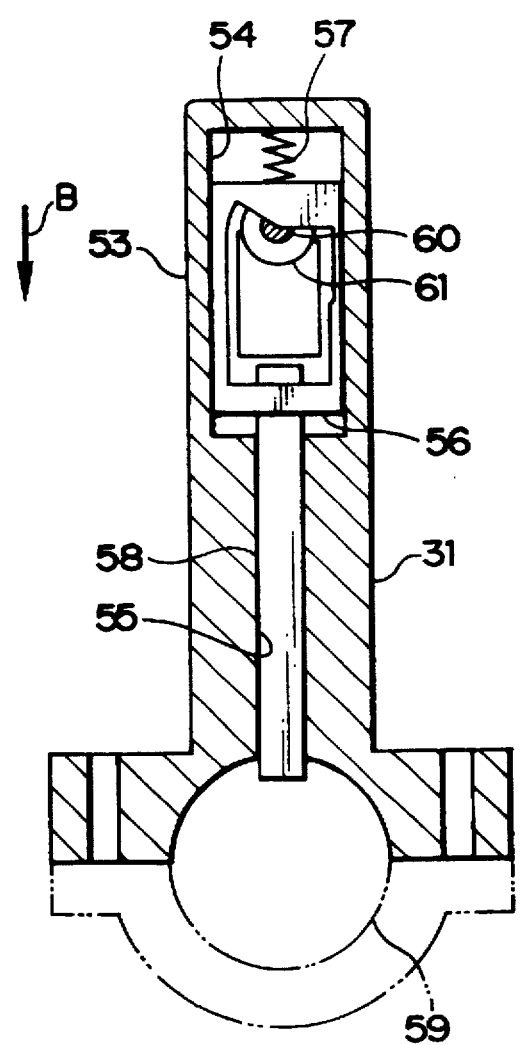
FIG. 12 is a transverse cross-sectional view of the ignition switch portion.

FIG. 12 shows the steering lock portion 31 which is connected to the ignition knob 23 via the ignition switch portion 30 and the flexible shaft 32 which have been described above. In this figure and FIG. 8, a sliding space portion 54 having a predetermined configuration and a through-hole 55 communicating with the sliding space portion 54 are disposed along the longitudinal direction of an elongated body 53. A lock stopper 56 having a rectangular framed configuration is disposed at the sliding space portion 54 so as to be slidable therewith. A compression coil spring 57 is provided between the lock stopper 56 and the inner peripheral wall of the slide space portion 54. Due to the urging force from the compression coil spring 57, the lock stopper 56 is pressed in the direction of the arrow indicated by B. Further, an elongated lock bar 58 is inserted into the through-hole 55. The tip end portion of the lock bar 58 projects from the body 53 in a state in which the proximal end portion of the lock bar 58 engages with the lock stopper 56. The lock bar 58 projecting from the body 53 engages with a concave portion (not shown) formed at a steering shaft 59. In this engaging state, the rotation of the steering shaft 59 is inhibited.

As a result, the steering lock cancellation means 29 is constituted by the lock stopper 56, the compression coil spring 57, and the lock bar 58.

On the other hand, a shaft 60 is supported by the sliding space portion 54 of the body 34 so as to be rotatable. A cam 61 is mounted to the shaft 61, and is disposed in the lock stopper 56 so that the inner peripheral surface of the lock stopper 56 abuts the outer peripheral surface of the cam 61 due to the urging force from the compression coil spring 57.

As shown in FIG. 8, the flexible shaft 32, which is connected to the shaft 25 of the ignition switch portion 30, is connected to the shaft 60 of the steering lock portion 31. The rotation of the ignition knob 23 is transmitted to the cam 61 via the flexible shaft 32. In this case, the cam 61 is formed into a configuration such that, when the ignition knob 23 has been set between the ACC position and the START position, the lock stopper 56 is caused to move in a direction opposite to that of the arrow B so as to resist the urging force from the compression coil spring 57. Accordingly, the entire portion of the lock bar 58 is incorporated into the body 53 due to the movement of the lock stopper 56 by the cam 61 (see FIG. 13).

In FIG. 1, the system ECU 19 comprises the keyless entry system and the engine starting system. As described above, in operation, the system ECU 19 as the keyless entry system outputs an instruction to the door trunk control means 20 in response to the received signal from the IC card holder 1. Further, as will be described later, in operation, the system ECU 19 as the engine starting system reads the IC code stored in the IC card 2 via the communication means 24, outputs a permission code to an engine ECU 62 in response to the input code from the switch 26 of the ignition switch portion 30 at the time when the IC code read corresponds to the preset register code, and outputs one of the ACC signal, ON signal, and START signal as needed.

The engine ECU 62 receives the input of an ON signal or a START signal only in a state in which a permission code has been input from the system ECU 19, and starts a vehicle engine in response to the input of the START signal.

The operation of the above-described structure will be explained hereinafter.

When a driver gets in a vehicle, the driver operates the unlock switch 7 in a state in which the IC card 2 which doubles as the driver's license is inserted into the IC card holder 1. The, unlock signal storing an ID code therein is transmitted from the IC card holder 1 by waves. Accordingly, the system ECU 19, which has been installed at the vehicle, determines whether or not the ID code from the received unlock signal and the preset register code correspond to each other. When they correspond to each other, the system ECU 19 instructs the door trunk control means to unlock the door lock mechanism in response to the unlock signal.

As a result, the door trunk control means 20 unlocks the door lock mechanism, and a passenger can open a vehicle door and get in the vehicle.

When a driver starts the vehicle engine, he or she sets the IC card holder 1 in the card setting portion 21 provided at a dashboard box. Thereafter, the driver rotationally operates the ignition knob 23 in a clockwise direction from the LOCK position. At this time, since the lock pin 42 is inserted into the first groove portion 44 formed at the back surface portion of the lock plate 35, in this inserted state, the ignition knob 23 is only enabled to rotate from the LOCK position to the CHECK position. Therefore, even when the ignition knob 23 is rotationally operated in a clockwise direction, the ignition knob 23 can only rotate to the CHECK position.

When the ignition knob 23 has been rotationally operated to the CHECK position, a code indicating that the ignition knob 23 has been set to the CHECK position is output to the system ECU 19 from the control circuit on the printed wiring board 51 of the ignition switch portion 30. The system ECU 19 is thereby set in an activating state (see FIG. 14(a)) so as to read the ID code stored in the storing portion 12 of the IC card 2 by communicating with the IC card 2 in a state of supplying power to the IC card 2 via the communication means 24, and determines whether or not the read ID code corresponds to the preset register code (see FIG. 14(b)).

When the ID code read corresponds to the preset register code, the system ECU 19 outputs a permission code to the engine ECU 62. Therefore, the engine ECU 62 is transferred to a state in which the vehicle engine is enabled being started (see FIG. 14(c)).

Further, since the system ECU 19 transmits a permission code to the ignition switch portion 30, the control circuit, which has received the permission code, causes the electromagnetic solenoid 41 to operate. The lock pin 42 is attracted by the electromagnetic solenoid 41, and the lock pin 42, which has been inserted into the first groove portion 44 of the lock plate 35, escapes from the first groove portion 44 so that the rotation of the lock plate 35 is enabled. As a result, the rotational operation of the ignition knob 23 from the CHECK position to the ACC position and its further positions is permitted (see FIG. 14(d)).

The length of time from the time during which the ignition knob 23 is set to the CHECK position to the time during which the rotational operation of the ignition knob 23 is permitted due to the operation of the electromagnetic solenoid 41 is extremely short. Accordingly, when an ordinary IC card is used, the ignition knob 23 can easily be set to the ACC position and its further positions by way of the LOCK position and the CHECK position.

Figure 13:
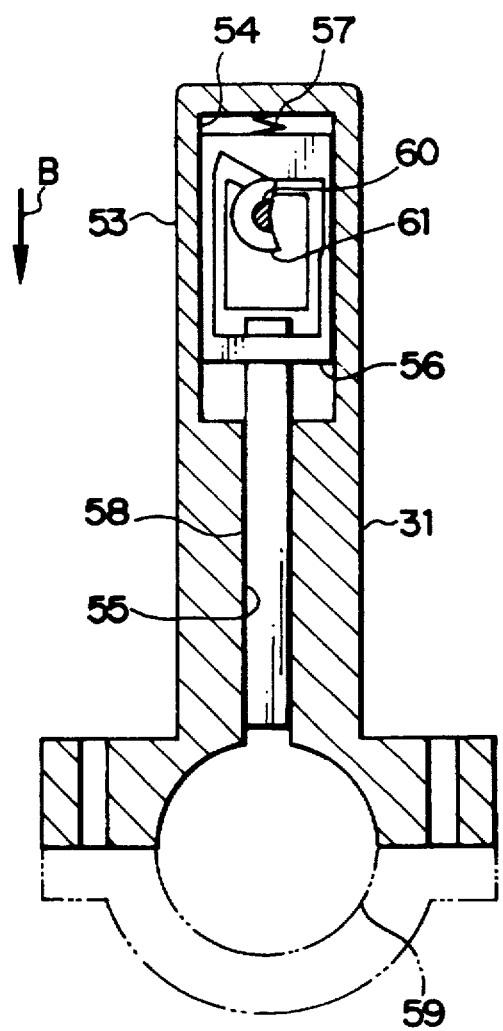
FIG. 13 is a view corresponding to FIG. 12 in a rotational state of a cam.

On the other hand, when the ignition knob 23 has been set to the ACC position and its further positions, as shown in FIG. 13, in cooperation with the above-described rotational operation of the ignition knob 23, the cam 61 of the steering lock portion 31 rotates so as to cause to move the lock stopper 56 to resist the urging force from the compression coil spring 57. Therefore, the state in which an inhibiting state of the rotation of the steering shaft 59 due to the lock bar 58 is canceled so that the rotational operation of the steering wheel 22 can be implemented (see FIGS. 14(e), (f)).

When the ignition knob 23 has been set from the ON position to the START position, following a code indicating that the ignition knob 23 has been set to the ON position, a code indicating that the ignition knob 23 has been set to the START position is output from the switch 26 of the ignition switch portion 30 (see FIGS. 14(g), (h)). Accordingly, the engine ECU 62 inputs the ON signal in a state in which the engine ECU 62 has received a permission code, and thereafter, inputs a START signal so as to start the engine.

Because the rotational operation due to the ignition knob 23 from the ON position to the START position is structured as a momentary method, when the ignition knob 23 has been rotationally operated to the START position, and thereafter, the rotational operation thereof has been canceled, the ignition knob 23 automatically returns to the ON position. As a result, the ignition knob 23 can operate in the same manner as a conventional ignition key.

Figure 14:
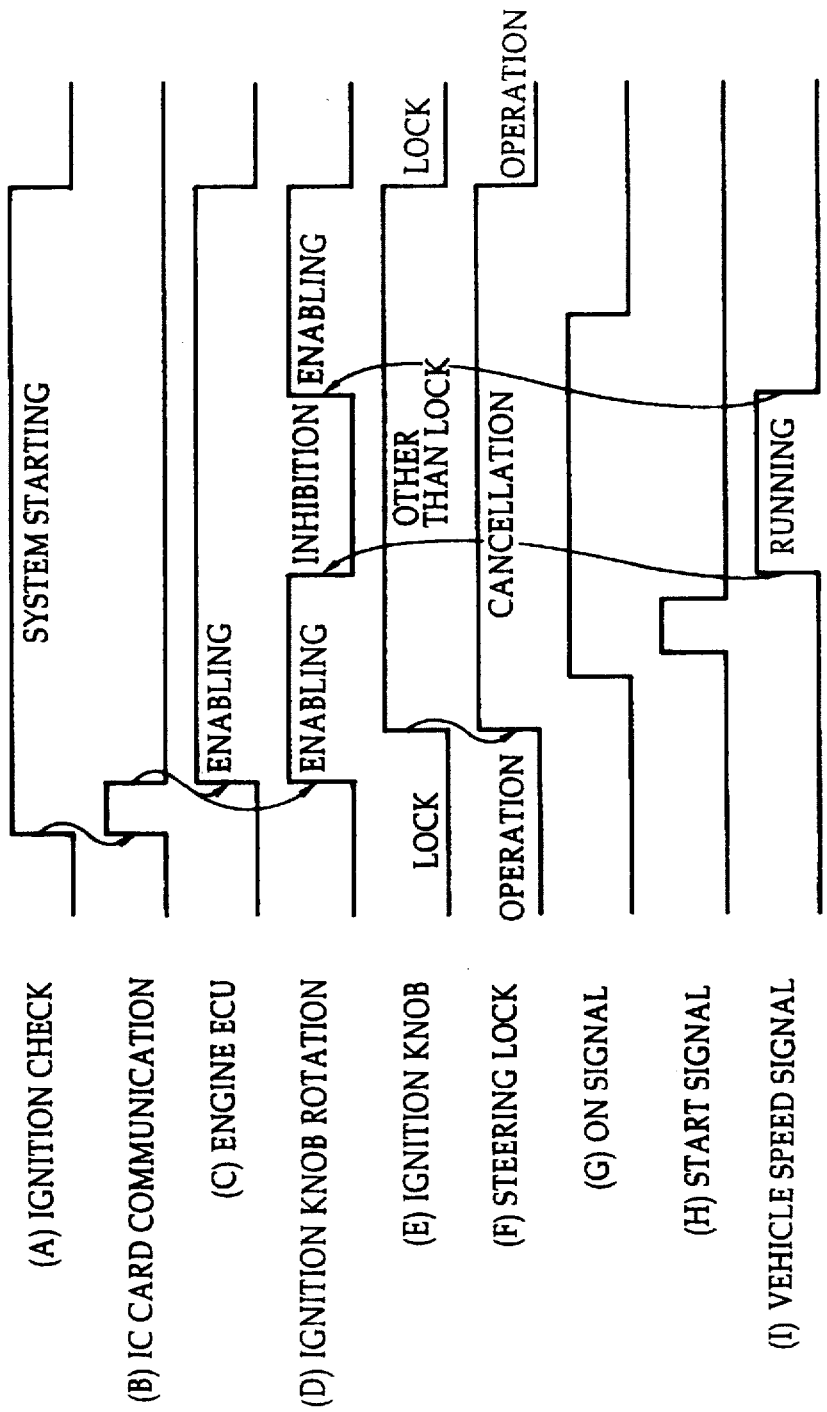
FIG. 14 is a timing chart illustrating an operational state of the present embodiment.

In this way, when a driver starts the engine to run the vehicle, a vehicle speed signal is input to the system ECU 19 from a vehicle speed sensor (not shown) (see FIG. 14 (i)). Accordingly, the system ECU 19 stops outputting of a permission code with respect to the ignition switch portion 30. Then, since the control circuit of the ignition switch portion 30 stops the operation for the electromagnetic solenoid 41 in cooperation with the above stopping operation, the lock pin 42 projects toward the lock plate 35 due to the urging force from the compression coil spring 43. At this time, since the ignition knob 23 has been set to the ON position, the projected lock pin 42 is caused to be inserted into the second groove portion 45 which is provided at the back surface portion of the lock plate 35. In this case, since the second groove portion 45 is provided so as to correspond from the ACC position to the START position of the ignition knob 23, the ignition knob 23 can rotate between the ACC position and the START position, and the rotational operations to the CHECK position and the LOCK position are thereby inhibited (see FIG. 14(d)).

When the vehicle stops, the vehicle speed signal which has been output to the system ECU 19 is interrupted so that the system ECU 19 again outputs a permission code to the ignition switch portion 30. Accordingly, the electromagnetic solenoid 41 is operated, and the lock pin 42, which has been inserted into the second groove portion 45 of the ignition knob 23, escapes from the second groove portion 45 so that the rotation of the ignition knob 23 is permitted (see FIG. 14(d)).

When a driver gets out of the vehicle, as described above, since the rotational operation of the ignition knob 23 is permitted in response to the stoppage of the vehicle, the ignition knob 23 is rotationally operated to the LOCK position. Then, the system ECU determines that the activation of the system has been finished, and thereby terminates outputs from various types of signals such as the output of a permission code to the engine ECU 62, the output of a permission code to the ignition switch portion 30, outputs from the ACC and ON and START signals, and the like. Therefore, in accordance with the termination of the system due to the system ECU 19, the lock pin 42 is inserted again into the first groove portion 44 of the ignition knob 23 so that the rotation of the ignition knob 23 is controlled once again.

When the ignition knob 23 is rotationally operated to the LOCK position, in association with the rotation of the cam 61 of the steering lock portion 31, the lock bar 58 engages with the steering shaft 59 so that the rotation of the steering wheel 22 is inhibited.

In the present embodiment which is structured as described above, since the IC card 2 which has been inserted into the IC card holder 1 is used to assemble the engine starting system, as far as the IC card is an ordinary one, the rotational operation with respect to the ignition knob 23 is permitted, while the rotational operation with respect to the steering wheel 22 is inhibited or enabled on the basis of the aforementioned rotational operation. Accordingly, using the IC card 2 provides the same function as an ordinary or conventional ignition key.

When the ID code which has been stored in the IC card 2 corresponds to a predetermined identification code, the system is activated and, only with the system in the activated state, the starting of the engine is enabled in accordance with the rotational position of the ignition knob 23. Therefore, by the vehicle starting system according to the present first embodiment, a higher safety can be provided as compared to a conventional ignition key.

In the present embodiment, since the IC card 2 is used so as to integrally assemble a keyless entry system in the engine starting system of the present invention as well, the added value of the system can be increased and the commercial value thereof can be improved accordingly.

Moreover, at the ignition switch portion 30, the knob rotation inhibiting means 27, the switch 26, and the like are housed in the body 34 in a closed state. Signals output from the switch 26 are encoded, and the safety of the ignition knob 23 is thereby improved.

In the related art, the relationship between the orientation of the ignition switch portion 30 and the steering lock 31 used to have a specified constraint. On the other hand, in the present first embodiment, since the shaft 25 and the shaft 60 are connected to each other by a flexible shaft 32 having flexibility, an arbitrary relationship between the orientation of the ignition switch portion 30 and the steering rod portion 31 can be secured. Therefore, the degree of freedom in designing a vehicle increases, and errors caused by operational irregularities at the time of production and assembly are reduced.

Figure 15:
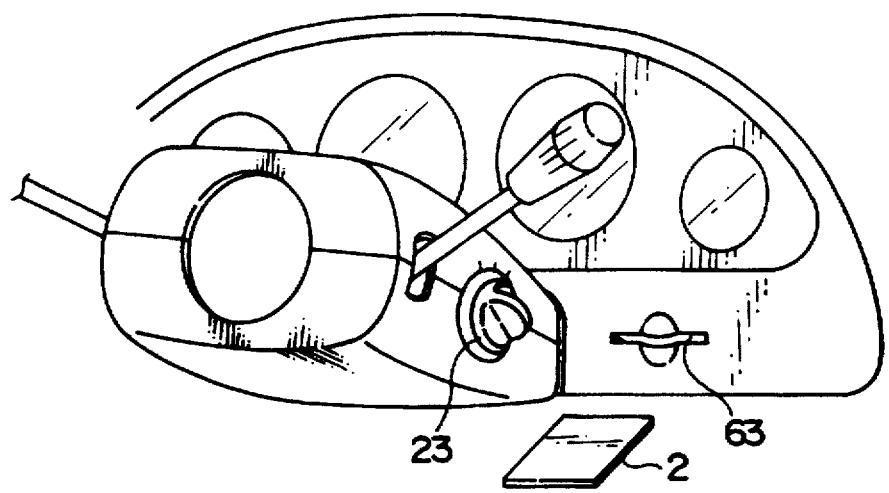
FIG. 15 is a view corresponding to FIG. 5 and illustrating a second embodiment of the present invention.

FIGS. 15 through 19 show the second embodiment of the present invention. Portions identical to those shown in the first embodiment are denoted by the same reference numbers and the description thereof will be omitted. In the second embodiment, as shown in FIG. 15, the card setting portion 63 is installed at an instrument panel, and the IC card 2 is directly inserted into the instrument panel. The ignition knob 23 is provided at a steering column cover.

Figure 16:
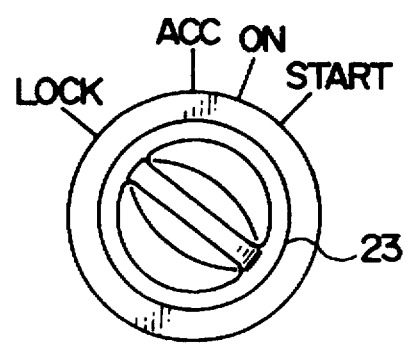
FIG. 16 is a view corresponding to FIG. 7.
Figure 17:
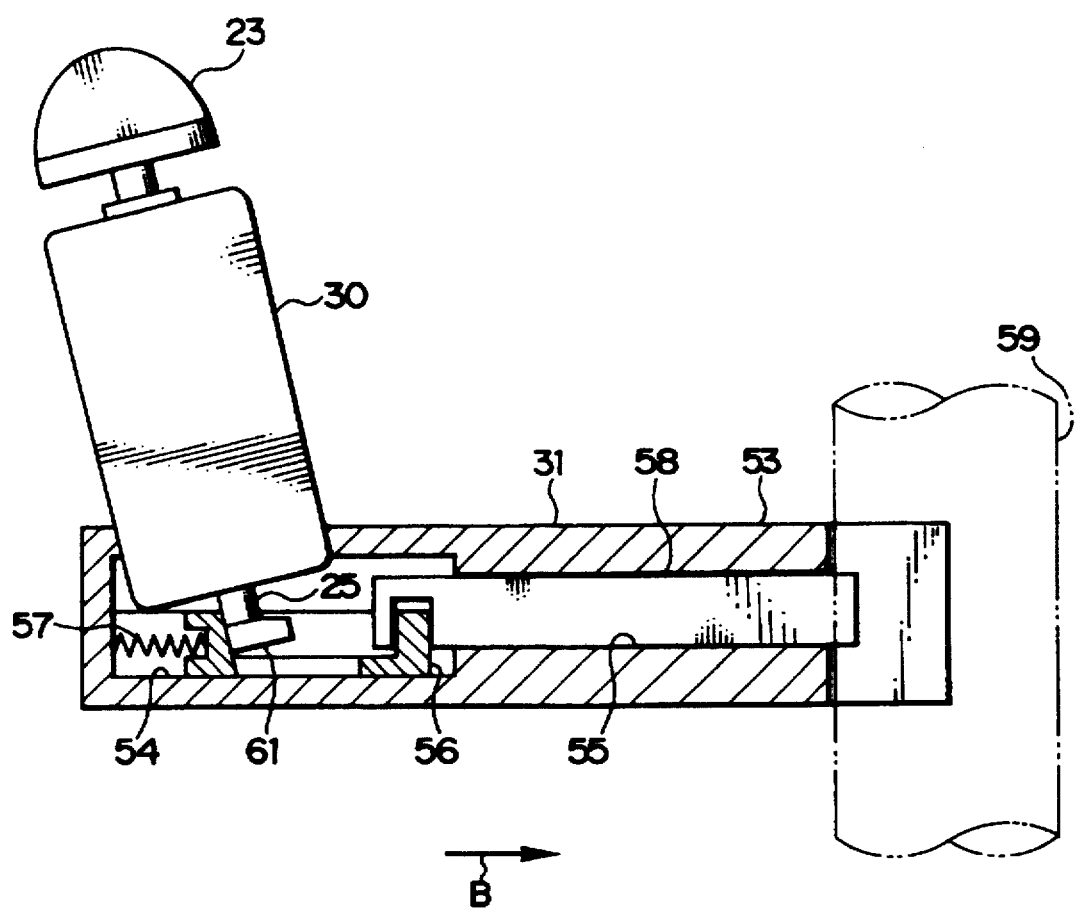
FIG. 17 is a view corresponding to FIG. 8.

As shown in FIG. 16, the second embodiment is different from the first embodiment in that the second embodiment has no CHECK position at the ignition knob 23. As shown in FIG. 17, the ignition switch portion 30 and the steering lock portion 31 are integrated with each other, and the cam 61 is directly fixed to the shaft 25 projecting from the ignition switch portion 30.

Figure 18:
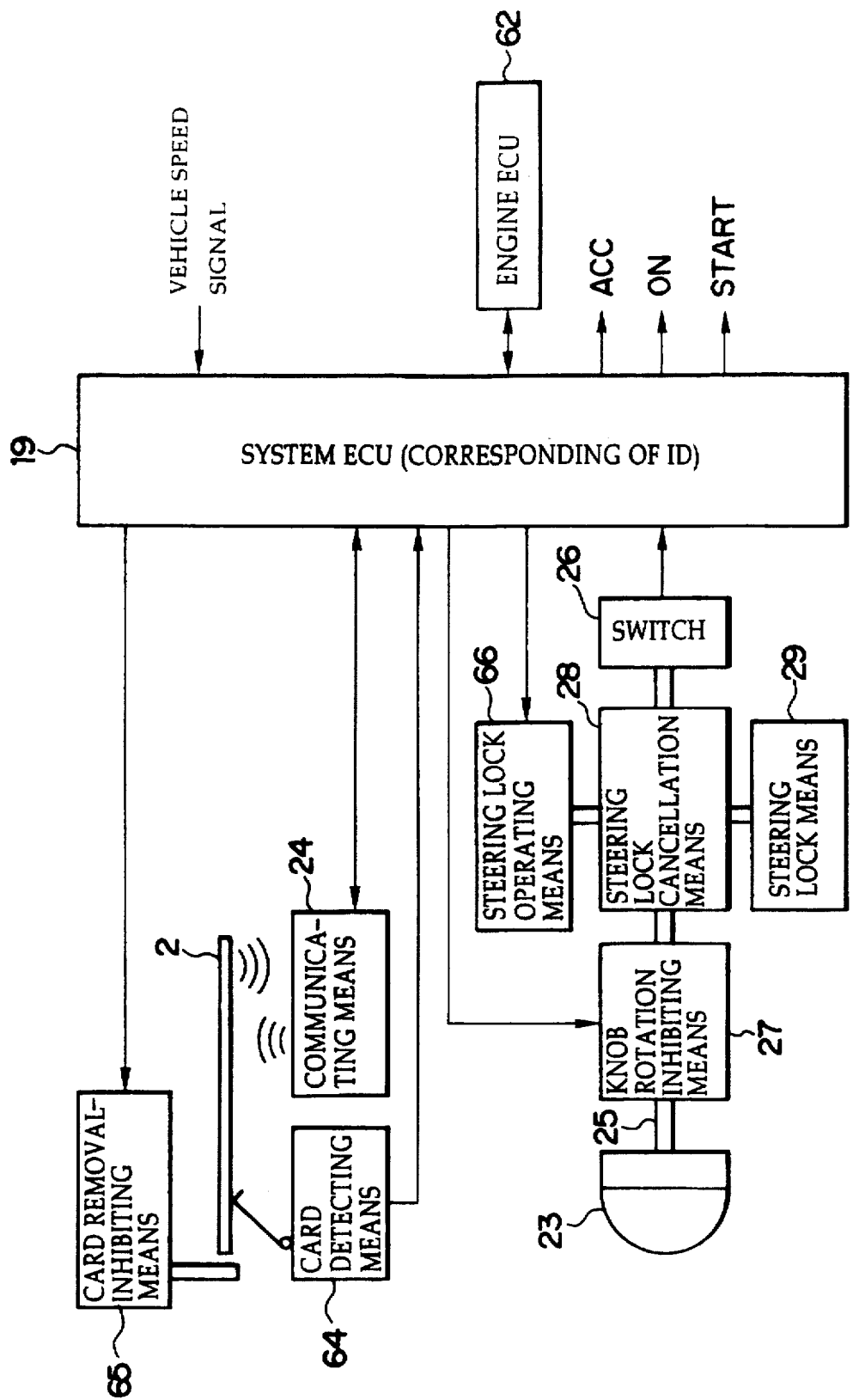
FIG. 18 is a view corresponding to FIG. 1.
Figure 19:
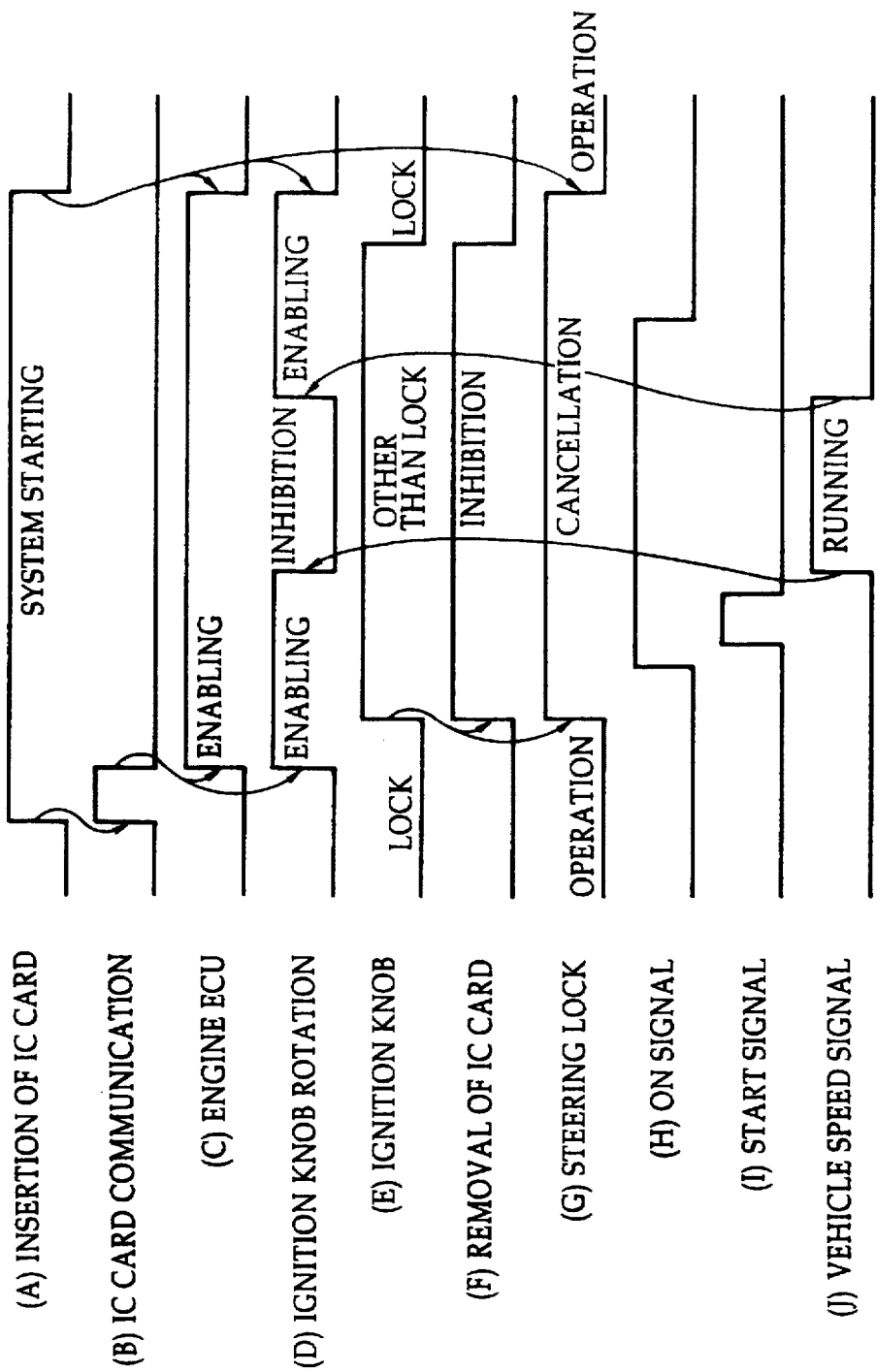
FIG. 19 is a view corresponding to FIG. 14.

FIG. 18 illustrates an overall structural view of the second embodiment in a function block. In this figure, a limit switch 64 serving as a card detecting means is provided at the card setting portion 63, and the limit switch 64 is turned on in a state in which the IC card 2 has been inserted into the card setting portion 63. A shutter 65 serving as a card removal-inhibiting means is provided at an insertion portion of the card setting portion 63 so as to close the insertion portion of the card setting portion 63 on the basis of the operation of the system ECU 19.

An electromagnet 66 serving as a steering lock operation means is provided at the steering lock portion 31. Even in a state in which a lock stopper 56 is attracted by the electromagnet 66, an inhibiting state of the rotation of the steering shaft 59 due to the lock bar 58 is canceled.

When the IC card 2 is inserted into the card setting portion 63, the limit switch 64 is turned on so that the system ECU 19 activates the system (see FIG. 19(a)) and reads the ID code which has been registered in the IC card 2 via the communication means 24 (see FIG. 19(b)). When the read ID code from the IC card 2 corresponds to the preset register code, the system ECU 19 enables the starting of an engine by outputting a permission code to the engine ECU 62 (see FIG. 19(c)), and enables the rotation of the ignition knob 23 by outputting a permission code to the ignition switch portion 30 (see FIG. 19(d)).

When the ignition knob 23 has been rotationally operated to positions other than the LOCK position (see FIG. 19(e)), the shutter 62 is operated so as to inhibit the IC card 2 from being removed from the card setting portion 63 (see FIG. 19(a)). Accordingly, when the ignition knob 23 has been rotationally operated to positions other than LOCK position, it becomes impossible to remove the IC card 2 from the card setting portion 63.

Further, when the ignition knob 23 has been rotationally operated to positions other than the LOCK position, since the system ECU 19 operates the electromagnet 66 so as to attract the lock stopper 56, the inhibiting state of the rotation of the steering shaft 59 due to the lock bar 58 in cooperation with the rotation of the cam 61 is canceled, and the inhibiting state of the rotation of the steering shaft 59 is also canceled by the magnetism of the electromagnet 66 (see FIG. 19(g)).

When a driver runs a vehicle by starting the engine of the vehicle by setting the ignition knob 23 to the START position, the system ECU 19 terminates the outputting of a permission code on the basis of the input of a vehicle speed signal. Accordingly, the operation of the electromagnetic solenoid 41 of the ignition switch portion 30 is interrupted so that the lock pin 42 engages with the second groove portion 45 of the ignition knob 23. Depending upon the above-described engagement, the ignition knob 23 is inhibited from rotating from the ACC position to the LOCK position (FIG. 19(d)).

When the driver stops the vehicle, the input of the vehicle speed signal to the system ECU 19 is interrupted, and the system ECU 19 outputs a permission code again to the ignition switch portion 30. Accordingly, the inhibiting state of the rotation of the ignition knob 23 due to the lock pin 42 is canceled so that the ignition knob 23 can be set to the LOCK position.

When the ignition knob 23 has been rotated to the LOCK position, in cooperation with the rotation of the ignition knob 23, the cam 61 cancels a pressing state thereof to the lock stopper 56. However, at this time, because the system ECU 19 keeps an attracting state of the lock stopper 56 due to the electromagnet 66 (FIG. 19(g)), the rotation of the steering shaft 59 is not inhibited.

When the IC card 2 is removed from the card setting portion 63 by the user, the system ECU 19 determines that the activation of the system has been completed so as to stop outputting a permission signal to the engine ECU 62 and outputting a permission code to the ignition switch portion 30, so that the rotation of the ignition knob 23 is inhibited.

The second embodiment is structured such that the system is activated in a state in which the IC card 2 has been inserted into the card setting portion 63. Further, when the ignition knob 23 has been set to positions other than the LOCK position, removal of the IC card 2 is prevented. Therefore, the system can be prevented from stopping unexpectedly because the IC card 2 has been removed.

Moreover, the second embodiment is structured such that, when the IC card 2 is removed from the card setting portion 63, the activation of the system is made to be completed. Therefore, insertion/removal of the IC card 2 can be effected as if the IC card 2 has the same function as that of an ordinary ignition key with regard to the status quo.

Figure 20:
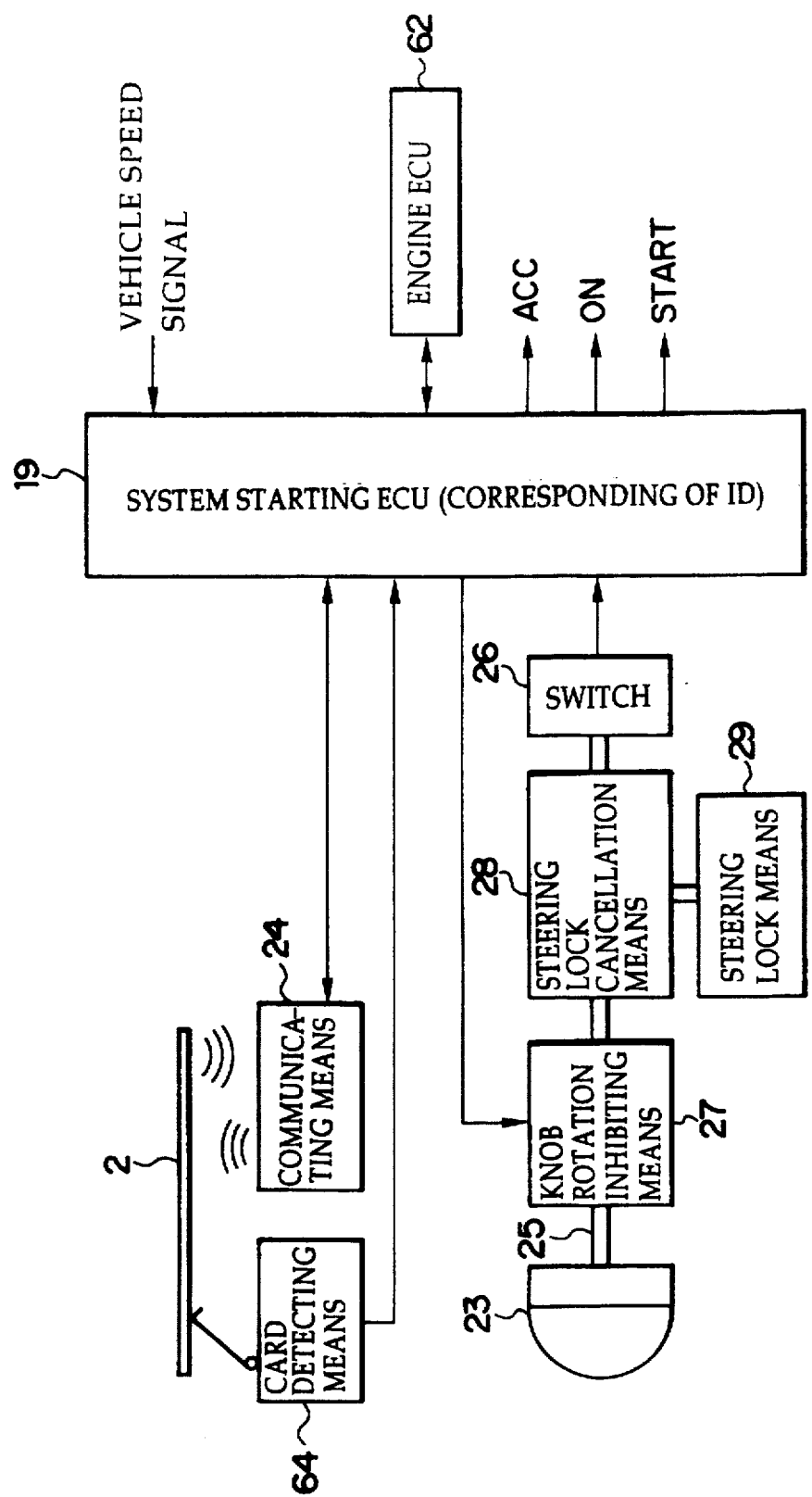
FIG. 20 is a view corresponding to FIG. 1 and illustrating a third embodiment of the present invention.
Figure 21:
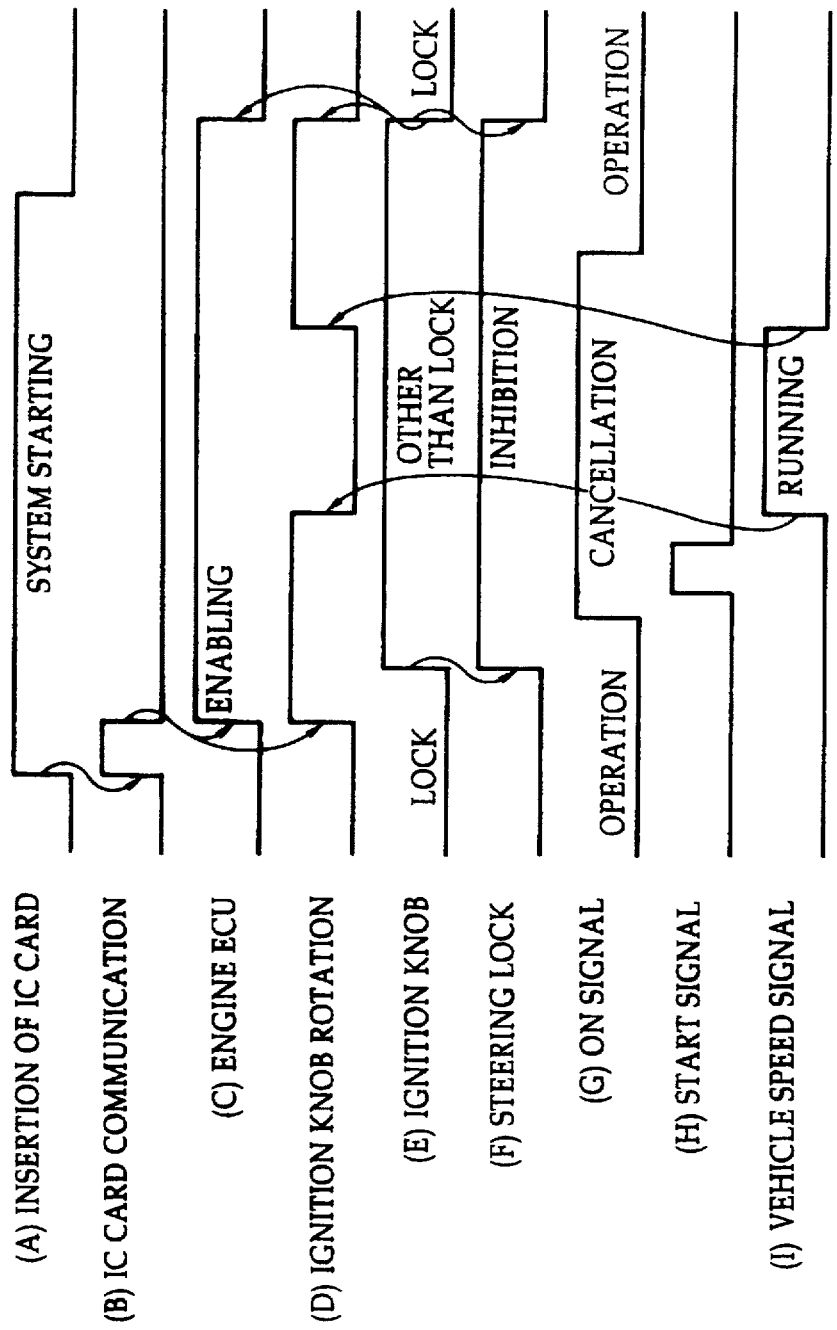
FIG. 21 is a view corresponding to FIG. 14.

In FIGS. 20 and 21, a third embodiment of the present invention is shown. Portions identical to those shown in the second embodiment are denoted by the same reference numbers and a description thereof will be omitted.

The above-described second embodiment is structured such that the removal of the IC card 2 is inhibited in a state that the IC card 2 has been inserted into the card setting portion 63. However, with this structure, each time when the user (driver) presents the IC card 2 which doubles as a driver's license, he or she must turn the ignition knob 23 to the LOCK position, and operation takes much time and effort.

In order to solve the above problem, a third embodiment of the present invention is characterized in that the shutter 65 for inhibiting the removal of the IC card 2 is detached so as to optionally remove the IC card 2 from the card setting portion 63. Accordingly, when the ignition knob 23 has been set to the LOCK position in a state in which the IC card 2 has been removed from the card setting portion 63, the system ECU 19 immediately inhibits permission to start the engine ECU 62, permission to rotate the ignition knob 23, and permission to rotate the steering shaft 59.

The present invention is not limited to the above-described embodiments. However, various modifications and/or extensions are applicable thereto as described hereinafter.

Figure 22:
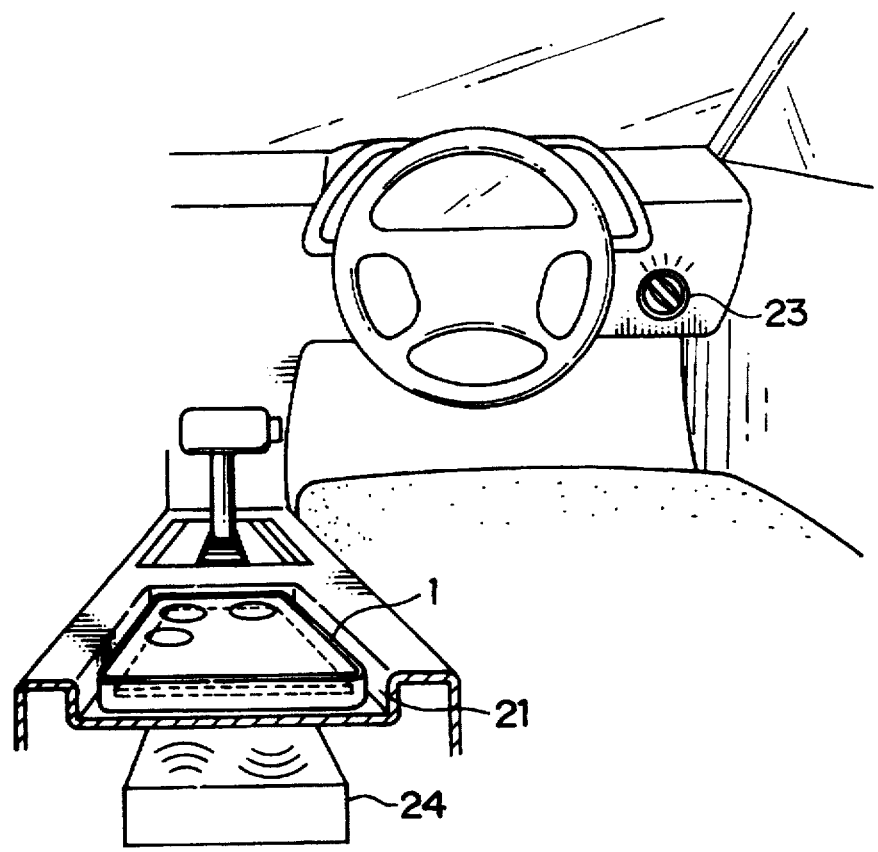
FIG. 22 is a view corresponding to FIG. 5 and illustrating another embodiment of the present invention.
Figure 23:
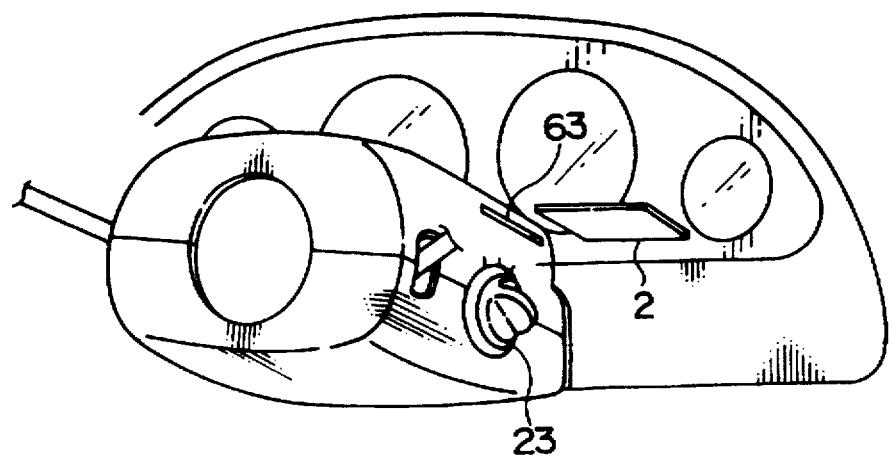
FIG. 23 is a view corresponding to FIG. 5 and illustrating another embodiment of the present invention.

The card setting portion 21 into which the IC card holder 1 is inserted, or the card setting portion 63 into which the IC card holder 2 is inserted 21 may be installed at a center console as shown in FIG. 22, or may be installed at a steering column cover as shown in FIG. 23.

The ignition knob 23 may effect a sliding operation instead of a rotational operation.

A memory card may be used instead of an IC card.

An IC card having a contact may be used so as to effect a communication in an electrically conductive state via the contact.

Effects of the Invention

A vehicle starting control device according to the present invention can effect inhibition and enabling of the rotation of a steering shaft as far as a storing medium is used as an ignition key. As a result, it is effective in the automobile industry to assemble a keyless entry system in the vehicle starting control device and to improve the safety of the system.

What is claimed is:

1. A vehicle starting control device, comprising:

a storing medium which stores a specific identification code;

media accommodating means which is provided at a vehicle and can accommodate said storing medium thereinto;

communication means which can communicate with said storing medium in a state in which said storing medium has been accommodated in said media accommodating means;

operation means which is operable between a run-inhibiting position which inhibits the running of the vehicle and a run-enabling position including an engine starting position, and which has a verification position between the run-inhibiting position and the run-enabling position so as to judge true or false for said storing medium;

steering lock means which inhibits the rotation of a steering shaft in a state in which said operation means has been set to the run-inhibiting position;

steering lock cancellation means which cancels a state inhibiting the rotation of the steering shaft due to said steering lock means in a state in which said operation means has been set to said run-enabling position;

operation-inhibiting means which inhibits said operation means from changing a position between said run-inhibiting position and said run-enabling position; and identification-enabling means which, when said operation means has been set to the verification position, reads an identification code stored in said storing medium via said communication means, identifies whether or not the identification code read and a register code which has been registered previously correspond to each other, and, when said identification code read and the register code correspond to each other, permits to effect a position changing operation between said run-inhibiting position and said run-enabling position.

2. A vehicle starting control device according to claim 1, wherein, when said operation means has been set to the run-inhibiting position in a state in which a position changing operation has been enabled, said identification-enabling means cancels the permission of the position changing operation.

3. A vehicle starting control device according to claim 1, further comprising: operation position detecting means for detecting which of the run-inhibiting position and the run-enabling position said operation means has been set to.

4. A vehicle starting control device according to claim 1, further comprising:

media detecting means which detects that said storing medium has been accommodated in said media accommodating means, wherein said identification-enabling means reads said identification code at the time when said media detecting means has detected that said storing medium has been accommodated in said media accommodating means, and identifies whether or not the identification code read and the register code correspond to each other.

5. A vehicle starting control device according to claim 1, wherein said communication means communicates with said storing medium via an electromagnetic coupler.

6. A vehicle starting control device according to claim 1, wherein said identification-enabling means encrypts an operation enabling signal indicating the permission of the operation due to said operation means, and outputs the encrypted operation enabling signal.

7. A vehicle starting control device according to claim 2, wherein said identification-enabling means inhibits the permission of said position changing operation from being canceled while a vehicle is in a running state.

8. A vehicle starting control device according to claim 3, wherein said operating position detecting means encrypts an operating position signal indicating an operating position due to said operation means, and outputs the encrypted operating position signal.

9. A vehicle starting control device according to claim 3, wherein said identification-enabling means, said operation-inhibiting means, and said operating position detecting means are installed in a closed housing body.

10. A vehicle starting control device according to claim 1, wherein said operation means and/or said operation-inhibiting means and said steering lock means and/or steering lock cancellation means are connected to each other by flexible connecting means with flexibility so as to be connectable to each other regardless their orientation.

11. A vehicle starting control device according to claim 10, wherein, when said operation means has been operated, the operation as a rotational force is transmitted to said steering lock means and/or said steering lock cancellation means by said flexible connecting means.

* * * * *